United States Patent
Mochizuki

(10) Patent No.: US 8,870,270 B2
(45) Date of Patent: Oct. 28, 2014

(54) STRUCTURE FOR LOWER VEHICLE BODY OF VEHICLE FRONT PART

(75) Inventor: Shinei Mochizuki, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 14/241,519

(22) PCT Filed: May 18, 2012

(86) PCT No.: PCT/JP2012/062774
§ 371 (c)(1),
(2), (4) Date: Feb. 27, 2014

(87) PCT Pub. No.: WO2013/054564
PCT Pub. Date: Apr. 18, 2013

(65) Prior Publication Data
US 2014/0225396 A1    Aug. 14, 2014

(30) Foreign Application Priority Data
Oct. 11, 2011   (JP) .................................. 2011-223901

(51) Int. Cl.
B62D 25/08    (2006.01)
B62D 25/20    (2006.01)

(52) U.S. Cl.
CPC ..................................... *B62D 25/20* (2013.01)
USPC ................... 296/187.09; 296/193.09; 296/70; 280/781

(58) Field of Classification Search
CPC ....................................................... B62D 25/20
USPC ............. 296/187.1, 187.09, 70, 204, 193.09, 296/209, 187.12, 203.02; 280/781
See application file for complete search history.

(56) References Cited

U.S. PATENT DOCUMENTS

| | | | |
|---|---|---|---|
| 7,699,385 B2 * | 4/2010 | Kurata | 296/204 |
| 2011/0272971 A1 * | 11/2011 | Kihara et al. | 296/203.02 |
| 2011/0272972 A1 * | 11/2011 | Takayanagi | 296/204 |

FOREIGN PATENT DOCUMENTS

| | | | |
|---|---|---|---|
| JP | 07-267148 A | 10/1995 |
| JP | 08-239056 A | 9/1996 |
| JP | 10-226358 A | 8/1998 |
| JP | 2000108930 A | 4/2000 |
| JP | 2000225966 A | 8/2000 |
| JP | 2001063621 A | 3/2001 |
| JP | 2002211436 A | 7/2002 |
| JP | 2011126365 A | 6/2011 |

OTHER PUBLICATIONS

International Search Report for Application No. PCT/JP2012/062774 dated Aug. 14, 2012.

* cited by examiner

*Primary Examiner* — Glenn Dayoan
*Assistant Examiner* — Pinel Romain
(74) *Attorney, Agent, or Firm* — Lerner, David, Littenberg, Krumholz & Mentlik, LLP

(57) ABSTRACT

Structure for lower vehicle body of vehicle front part is disclosed herein. In some embodiments, structure includes suspension frame fastened to connection parts of front side members and floor side members; dash side members extend from fastening parts obliquely rearward and outward in vehicle width direction; outer end parts of dash side members connected to front end parts of side sills; front surfaces of lower parts of side outer panels arranged ahead of front end parts of side sills; dash side outer panels, side outer panels, and dash side inner panels connected together by flanges extending in vehicle up-down direction of front end part of each thereof, at positions of front surfaces of lower parts of side outer panels, side outer panels formed into an inclined surface inclined obliquely downward toward vehicle rear in side view and inclined obliquely rearward toward outside of vehicle in top view.

7 Claims, 4 Drawing Sheets

STRUCTURE FOR LOWER VEHICLE BODY OF VEHICLE FRONT PART

This application is a national phase entry under 35 U.S.C. §371 of International Application No. PCT/JP2012/062774, filed May 18, 2012, which claims the benefit of priority to Japanese Patent Application No. 2011-223901, filed Oct. 11, 2011, the disclosure of which is hereby incorporated herein by reference.

TECHNICAL FIELD

The present invention relates to a structure for lower vehicle body of vehicle front part.

BACKGROUND ART

Conventionally, a vehicle such as a four-wheeled motor vehicle has a structure for lower vehicle body of vehicle front part as described below. A dash side inner panel and a dash side outer panel are provided on each of the right and left sides in a vehicle width direction. Front side members and floor side members extend in a vehicle front-to-rear direction, and each front side member is connected to the corresponding floor side member. A suspension frame is fastened to connection parts of the members. Dash side members extend laterally outward from fastening parts of the suspension frames. Outer end parts of the dash side members are connected to front end parts of side sills. Front-wheel tires are arranged ahead of the side sills (see PTL 1 to 3, for example).

CITATION LIST

[PTL 1] Japanese Patent Application Publication No. 2000-108930
[PTL 2] Japanese Patent Application Publication No. Hei 7-267148
[PTL 3] Japanese Patent Application Publication No. 2000-225966

SUMMARY OF INVENTION

Technical Problem

Such conventional lower vehicle body structures do not have a sufficient strength of connecting the dash side member and the side sill, and arrangement and shapes of members such as the dash side members are not devised well. Thus, when a load is applied from a vehicle front, it is difficult to transmit the load to portions in the vehicle rear to disperse the load. Not only the front side members, the dash side members, and the side sills but also vehicle body panels around the vehicle front part might be deformed. In addition, a load applied from the front-wheel tires during the driving is transmitted to vehicle body fastening parts through the suspension frame, and thus might cause deformation and vibrations of peripheral parts, noise, and the like.

Meanwhile, for the conventional lower vehicle body structure, a method has been proposed by which the rigidity is enhanced by connecting reinforcements to back sides of the front end parts of the side sills. However, installing the reinforcements has problems of leading to high parts costs and a weight increase and of lowering attachment workability due to attaching labor increase.

The present invention has been made in view of the above circumstances. An object thereof is to provide a structure for lower vehicle body of vehicle front part making it possible to achieve improvement of the rigidity of the lower vehicle body without high parts costs and a weight increase, to disperse a load applied from the vehicle front by efficiently smoothly transmitting the load to a vehicle rear such as dash side members, floor side members, side sills, and the like, and to reduce deformation of the lower vehicle body.

Solution to Problem

In order to solve the above problem of the conventional technique, the present invention provides a structure for lower vehicle body of vehicle front part, wherein a dash side inner panel and a dash side outer panel are provided on each of right and left sides in a vehicle width direction, a front side member and a floor side member which extend in a vehicle front-to-rear direction are connected together, a suspension frame is fastened to a connection part of the front side member and the floor side member, a dash side member is provided in such a manner as to extend from each fastening part of the suspension frame obliquely rearward and outward in the vehicle width direction, an outer end part of the dash side member is connected to a front end part of a side sill, a front surface of a lower part of a side outer panel is arranged ahead of the front end part of the side sill, flanges extending in a vehicle up-down direction are respectively provided to front end parts of the side outer panel, the dash side inner panel, and the dash side outer panel, the dash side outer panel, the side outer panel, and the dash side inner panel are connected together by means of the flanges at a position of the front surface of the lower part of the side outer panel, and the front surface of the lower part of the side outer panel is formed into an inclined surface which is inclined obliquely downward toward a vehicle rear in a vehicle side view and inclined obliquely rearward toward the outside of the vehicle in a vehicle top view.

In addition, in the present invention, the front surface of the lower part of the dash side inner panel and a front end part of a side sill outer panel forming the side sill are formed into inclined surfaces along the front surface of the lower part of the side outer panel and are arranged in an overlapping manner, and the three of the dash side inner panel, the side sill outer panel, and the side outer panel are connected together by spot welding in an overlapping surface portion.

Moreover, in the present invention, an angle of inclination of the front surface of the dash side member toward the vehicle rear and an angle of inclination of the front surface of the lower part of the side outer panel are set to coincide with each other.

Furthermore, in the present invention, a flange extending in the vehicle up-down direction is provided to an outer end part of the dash side member, and the flange of the dash side member is connected to the flanges of the side outer panel and the dash side inner panel.

Advantageous Effects of Invention

As described above, in the structure for lower vehicle body of vehicle front part according to the present invention, the dash side inner panel and the dash side outer panel are provided on each of the right and left sides in the vehicle width direction. In addition, the front side member and the floor side member which extend in the vehicle front-to-rear direction are connected together. The suspension frame is fastened to the connection part of the front side member and the floor side member. The dash side member is provided in such a manner as to extend from each fastening part of the suspension frame obliquely rearward and outward in the vehicle width direction. The outer end part of the dash side member is connected to the front end part of the side sill. The front surface of the lower part of the side outer panel is arranged ahead of the front end part of the side sill. The flanges extending in the vehicle up-down direction are respectively provided to the front end parts of the side outer panel, the dash side inner panel, and the dash side outer panel. The dash side outer panel, the side outer panel, and the dash side inner panel are connected together by means of the flanges at the position of the front surface of the lower part of the side outer panel. The front surface of the lower part of the side outer panel is formed into the inclined surface which is inclined obliquely downward toward the vehicle rear in the vehicle side view and inclined obliquely rearward toward the outside of the vehicle in the vehicle top view. Thus, a load transmitted from the vehicle front to the dash side member can be dispersed to reduce the burden of the front side member. In addition, the rigidity of the lower vehicle body can be improved without providing separate components such as reinforcements, the provision leading to high parts costs, a weight increase, and attaching labor increase, and deformation of the lower vehicle body due to the load applied from the vehicle front can be effectively reduced.

Moreover, according to the lower vehicle body structure of the present invention, when the load is applied from the vehicle front to the front side member, the load applied to the front side member is transmitted to the side sill through the dash side member while being dispersed to the dash side member and the floor side member. In addition, when causing the front-wheel tire to move backward to the vehicle rear to come into contact with the front surface of the lower part of the side outer panel, the load from the vehicle front is applied to the dash side member and the side sill. For this reason, the load from the vehicle front can be received by the entire side sill through the dash side member and the side outer panel, and can be effectively transmitted to the vehicle rear including the side sill.

Further, according to the lower vehicle body structure of the present invention, the front surface of the lower part of the side outer panel is inclined in the predetermined direction, and no unnecessary portion exists ahead of the front end part of the side sill. Thus, the vehicle can be made lighter by minimizing parts shapes.

Besides, in the present invention, the front surface of the lower part of the dash side inner panel and the front end part of the side sill outer panel forming the side sill are formed into inclined surfaces along the front surface of the lower part of the side outer panel and arranged in the overlapping manner. In addition, the three of the dash side inner panel, the side sill outer panel, and the side outer panel are connected together by spot welding in the overlapping surface portion. Thus, it is possible to: significantly improve the rigidity of the front surface of the lower part of the side outer panel, the vehicle torsional rigidity, the suspension attaching rigidity, and the like; reduce the deformation of the front end part of the side sill due to the load applied from the vehicle front; and reliably disperse the load by using the inclined front surface of the lower part of the side outer panel. Also, the suspension frame to which a rotation load applied from each front-wheel tire during driving, deceleration and acceleration loads, vibrations, and the like are applied is fastened at the fastening parts having high rigidity on the vehicle body side. Thus, it is possible to achieve driving stability and reduce the vibrations and noise.

Further, in the present invention, the angle of inclination of the front surface of the dash side member toward the vehicle rear and the angle of inclination of the front surface of the lower part of the side outer panel are set to coincide with each other. Thus, it is possible: to reliably change the direction of the load applied from the vehicle front to the vehicle up-down and width directions, instead of the straight direction to the rear of the side sill; and thus to disperse the load to the vehicle body portions located in the vehicle rear.

Still further, in the present invention, the flange extending in the vehicle up-down direction is provided to the outer end part of the dash side member, and the flange of the dash side member is connected to the flanges of the side outer panel and the dash side inner panel. Thus, the rigidity of the lower vehicle body can be improved further.

DESCRIPTION OF EMBODIMENTS

Figure 1:
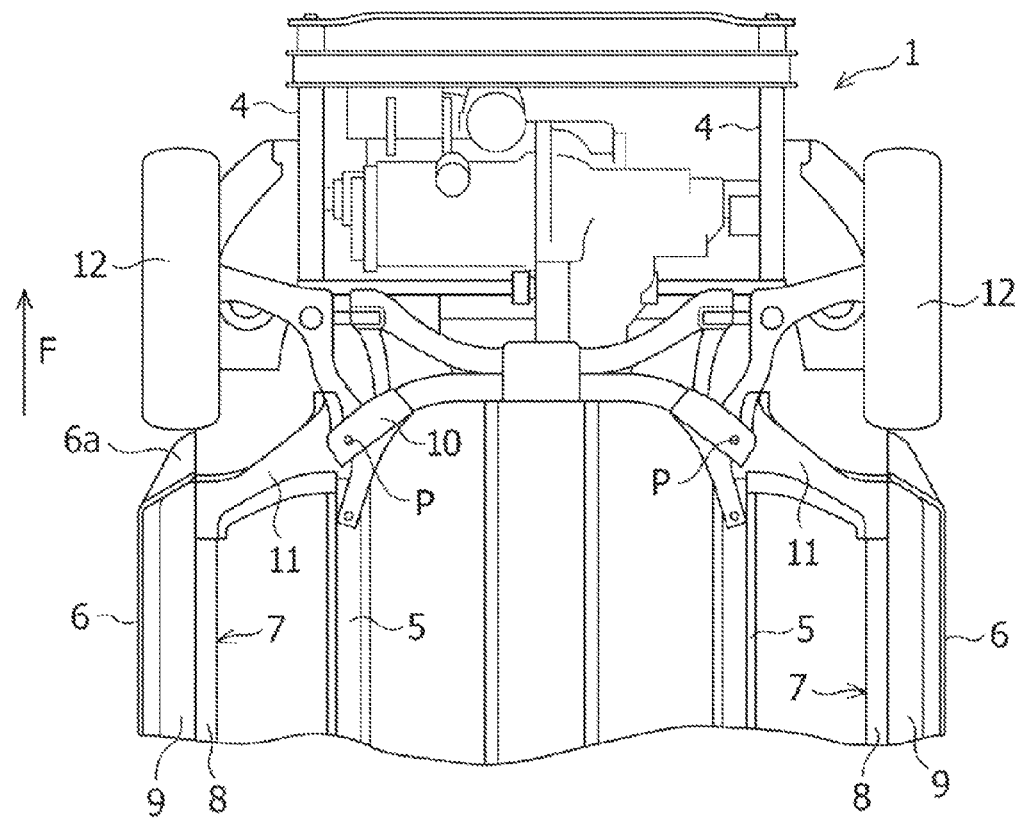
FIG. 1 is a plan view of a vehicle front part to which a lower vehicle body structure according to an embodiment of the present invention is applied, which is seen from below.

Hereinbelow, the present invention will be described in detail based on an illustrated embodiment.

FIGS. 1 to 5 show a structure for lower vehicle body of vehicle front part according to the embodiment of the present invention.

A vehicle according to the embodiment of the present invention is a motor vehicle of a four-wheeled type as shown in FIGS. 1 to 5. In a lower vehicle body structure of a vehicle front part 1 of this type, the vehicle front part 1 mainly includes dash side inner panels 2, dash side outer panels 3, front side members 4 and floor side members 5, side outer panels 6, and side sills 7. The dash side inner panels 2 and the dash side outer panels 3 are provided on the right and left sides in a vehicle width direction. The front side members 4 and the floor side members 5 are arranged on the inner side of the vehicle than the dash side inner panels 2 and the dash side outer panels 3 and extend in a vehicle front-to-rear direction. The side outer panels 6 respectively form side parts of a vehicle body by extending in the vehicle front-to-rear direction and a vehicle up-down direction. The side sills 7 are each arranged below a door opening part on the inner side of the side outer panels 6 of the vehicle and extend in the vehicle front-to-rear direction. Each dash side inner panel 2 and each dash side outer panel 3 are connected to each other while being overlapped on the inner side and outer side in the vehicle width direction, and thereby are formed in a closed cross-sectional shape. In addition, each side sill 7 is formed by connecting a side sill inner panel 8 and a side sill outer panel 9 with each other while being overlapped on the inner side and the outer side in the vehicle width direction. Note that in FIG. 1 and FIG. 5 an arrow F points to the vehicle front.

A rear end part of each front side member 4 and a front end part of each floor side member 5 are connected to each other. End parts of a suspension frame 10 are fastened to these connection parts of each front side member 4 and each floor side member 5 by using bolts or the like. In addition, as shown in FIGS. 1, 2, and 5, dash side members 11 having a hat-shaped cross section and having an opening part thereof arranged upward are each provided between the connecting portion of the front side member 4 and the floor side member 5 and a front end part of the side sill 7.

Each of the dash side members 11 of this embodiment extends from a corresponding one of fastening parts P of the suspension frame 10 while being inclined obliquely rearward and outward in the vehicle width direction. An outer end part of the dash side member 11 is connected to an end part of the corresponding side sill inner panel 8 forming the side sill 7. An inner end part of the dash side member 11 is connected to a vicinity of the connection part of the front side member 4 and the floor side member 5. A front-wheel tire 12 is arranged ahead of the side sill 7 as shown in FIG. 1.

Figure 2:
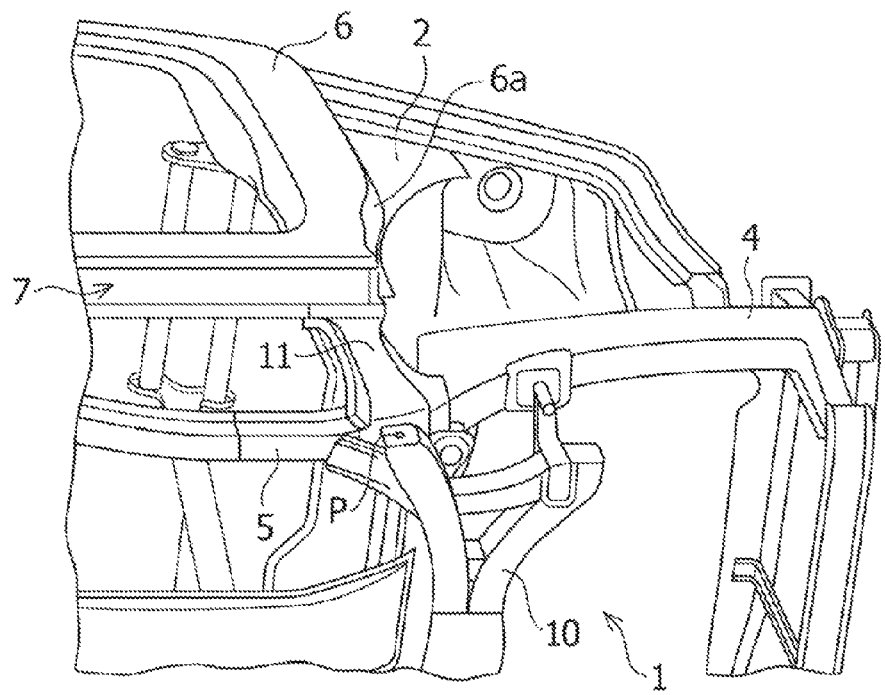
FIG. 2 is a perspective view of the vehicle front part in FIG. 1, which is seen obliquely from below.
Figure 3:
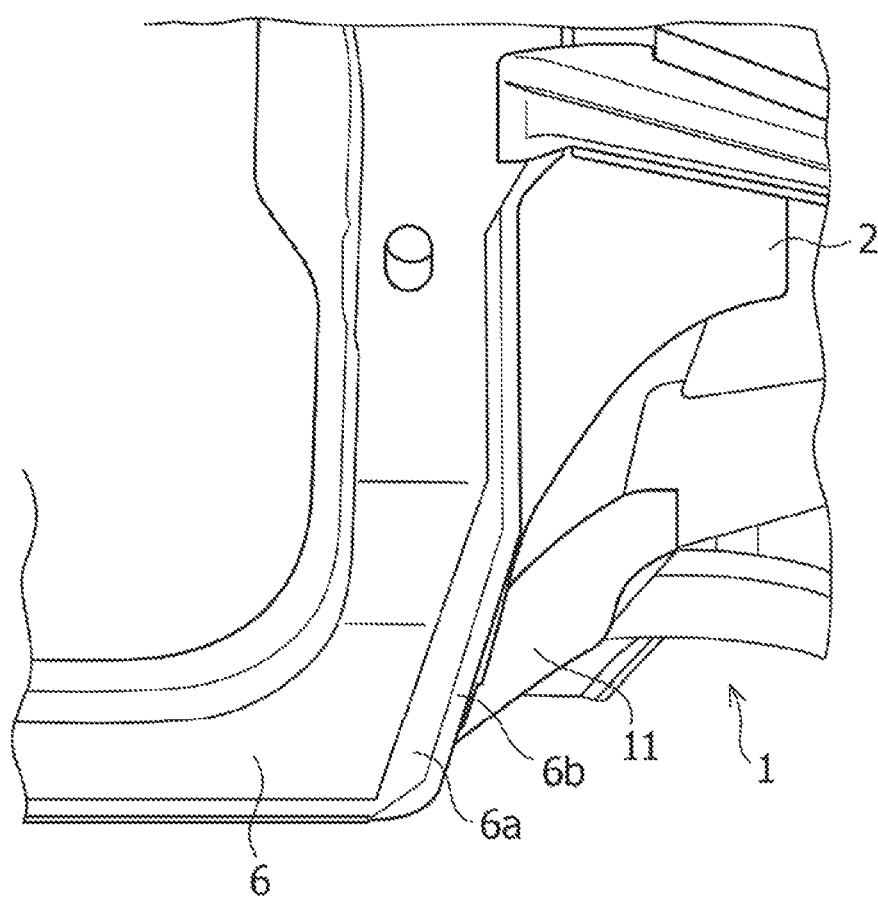
FIG. 3 is a side view showing the vehicle front part to which the lower vehicle body structure according to the embodiment of the present invention is applied.
Figure 4A:
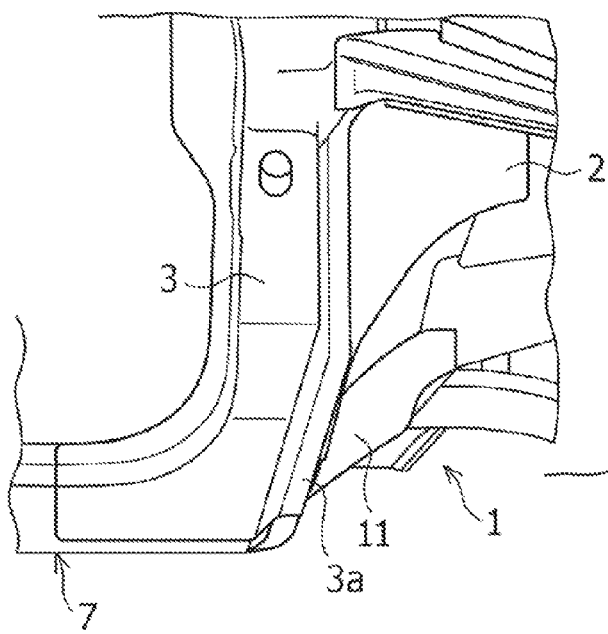
FIG. 4(a) is a side view showing a state in which a side outer panel is removed from the vehicle front part in FIG. 3.
Figure 4B:
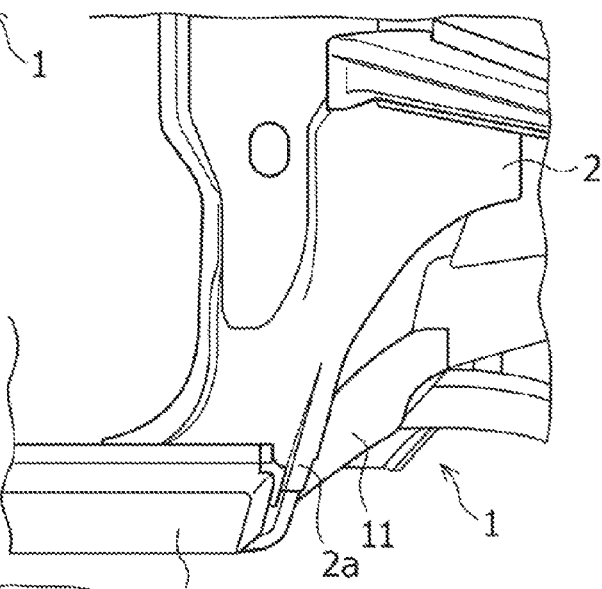
FIG. 4(b) is a side view showing a state in which a dash side outer panel is removed from the vehicle front part in FIG. 4(a).
Figure 4C:
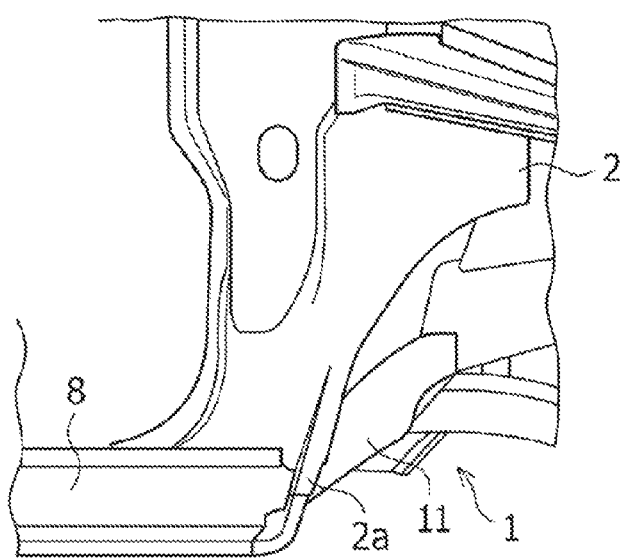
FIG. 4(c) is a side view showing a state in which a side sill outer panel is removed from the vehicle front part in FIG. 4(b).
Figure 5:
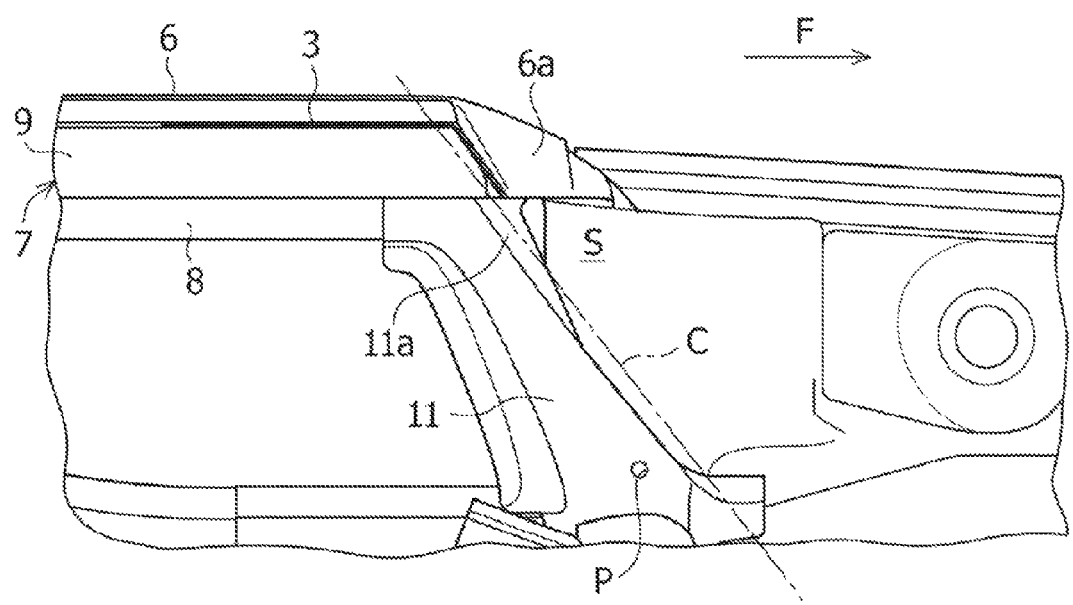
FIG. 5 is a plan view showing an outside portion of the vehicle front part in FIG. 1.

In addition, as shown in FIGS. 1, 3 and 5, a front surface 6a of a lower part of the side outer panel 6 is arranged ahead of the front end part of the side sill 7 of this embodiment. Hence, the front surface 6a of the lower part of the side outer panel 6 is formed to be bent toward the inside of the vehicle in such a manner as to cover the front end part of the side sill inner panel 8. The front surface 6a is formed into a wide inclined surface which is inclined obliquely downward toward the vehicle rear in a side view and is obliquely rearward toward the outside of the vehicle in a top view. Inclination of a front surface 11a of the dash side member 11 toward the vehicle rear and the front surface 6a of the lower part of the side outer panel 6 are set at the same angle (see a chain line C in FIG. 5). Such inclined surfaces make it possible to omit components of a lower vehicle body in a vehicle front region S ahead of the front surface 11a of the dash side member 11 and achieve lightening according to the absence of unnecessary components.

Moreover, flanges 6b, 2a, and 3a extending in the vehicle up-down direction are respectively provided to front end parts of the side outer panel 6, the dash side inner panel 2, and the dash side outer panel 3. The flanges 3a, 6b, and 2a of the dash side outer panel 3, the side outer panel 6, and the dash side inner panel 2 are connected together at a position of the front surface 6a of the lower part of the side outer panel 6.

Further, a lower front part of the dash side inner panel 2 and a front end part of the side sill outer panel 9 in this embodiment are respectively formed into on inclined surfaces along the front surface 6a of the lower part of the side outer panel 6, and the dash side inner panel 2, the side sill outer panel 9, and the side outer panel 6 are arranged in such a manner that the front surfaces or the like thereof overlap one another. The three of the dash side inner panel 2, the side sill outer panel 9, and the side outer panel 6 are connected one another by spot welding in the overlapping surface portion. Besides, a flange extending in the vehicle up-down direction is provided to the outer end part of the dash side member 11, and is connected to the flanges 6b and 2a of the side outer panel 6 and the dash side inner panel 2. Accordingly, in the lower vehicle body structure of this embodiment, the side outer panel 6, the dash side inner panel 2, and the dash side outer panel 3 are connected together from the vehicle top, the dash side member 11 is connected thereto in the vehicle width direction, and the side sill outer panel 9 and the side sill inner panel 8 are connected thereto from the vehicle rear.

As described above, in the structure of the lower vehicle body of the vehicle front part 1 according to this embodiment of the present invention, the suspension frame 10 is fastened to the connection parts of the front side member 4 and the floor side member 5 which extend in the vehicle front-to-rear direction. In addition, the dash side members 11 are provided in such a manner as to extend from the fastening parts P of the suspension frame 10 obliquely rearward and outward in the vehicle width direction. The outer end part of each dash side member 11 is connected to the corresponding front end part of the side sill inner panel 8. The front surfaces 6a of the lower parts of the side outer panels 6 are arranged ahead of the front end parts of the side sills 7. The flanges 6b, 2a, and 3a extending in the vehicle up-down direction are provided to the front end parts of the side outer panels 6, the dash side inner panels 2, and the dash side outer panels 3. The flanges 3a, 6b, and 2a of the dash side outer panels 3, the side outer panels 6, and the dash side inner panels 2 are connected together at positions of the front surfaces 6a of the lower parts of the side outer panels 6. The lower front surfaces of each dash side inner panel 2 and the front end part of each side sill outer panel 9 are formed into the surfaces inclined along the corresponding front surface 6a of the lower part of the side outer panel 6 and are arranged in an overlapping manner. The three of the dash side inner panel 2, the side sill outer panel 9, and the side outer panel 6 are connected together by the spot welding in the overlapping surface portion. The flange extending in the vehicle up-down direction is provided to the outer end part of the dash side member 11. The flange of the dash side member 11 is connected to the flanges of the side outer panel 6 and the dash side inner panel 2. The front surface 6a of the lower part of the side outer panel 6 is formed into an inclined surface which is inclined obliquely downward toward the vehicle rear in the side view and is obliquely rearward toward the outside of the vehicle in the top view. Thus, the rigidity of positions at which a load is applied from the vehicle front can be improved without providing separate components. The load applied from the vehicle front can be transmitted to the side sills 7 and the like in the vehicle rear through the dash side members 11 and the side outer panels 6 while being dispersed efficiently, and deformation of the lower vehicle body such as the side sills 7 can be prevented. In addition, the suspension frame 10 to which a rotation load applied from the front-wheel tire 12 during driving, deceleration and acceleration loads, vibrations, and the like are applied is fastened at the fastening parts P having high rigidity. Thus, it is possible to enhance driving stability, reduce the vibrations and noise, and enhance the driving maneuverability and cabin comfortability.

Moreover, in the lower vehicle body structure of this embodiment, the front surfaces 11a of the dash side members 11 and the front surfaces 6a of the lower parts of the side outer panels 6 are formed and arranged to be inclined toward the vehicle rear at the same angle. Thus, no unnecessary component exists in the vehicle front regions S ahead of the front end parts of the side sills 7 and the front surfaces 11a of the dash side members 11, and the vehicle can be made lighter according to the unnecessary components.

The embodiment of the present invention has heretofore been described. However, the present invention is not limited to the described embodiment, and various modifications and changes can be made based on the technical idea of the present invention.

REFERENCE SIGNS LIST 1 vehicle front part
2 dash side inner panel
2a flange
3 dash side outer panel 3a flange
4 front side member
5 floor side member
6 side outer panel
6a front surface of lower part of side outer panel
6b flange
7 side sill
8 side sill inner panel
9 side sill outer panel
10 suspension frame
11 dash side member
11a front surface of dash side member
12 front-wheel tire
P fastening part of suspension frame

What is claimed is:

1. A structure for lower vehicle body of vehicle front part, wherein
    a dash side inner panel and a dash side outer panel are provided on each of right and left sides in a vehicle width direction,
    a front side member and a floor side member which extend in a vehicle front-to-rear direction are connected together,
    a suspension frame is fastened to a connection part of the front side member and the floor side member,
    a dash side member is provided in such a manner as to extend from each fastening part of the suspension frame obliquely rearward and outward in the vehicle width direction,
    an outer end part of the dash side member is connected to a front end part of a side sill,
    a front surface of a lower part of a side outer panel is arranged ahead of the front end part of the side sill,
    flanges extending in a vehicle up-down direction are respectively provided to front end parts of the side outer panel, the dash side inner panel, and the dash side outer panel,
    the dash side outer panel, the side outer panel, and the dash side inner panel are connected together by means of the flanges at a position of the front surface of the lower part of the side outer panel, and
    the front surface of the lower part of the side outer panel is formed into an inclined surface which is inclined obliquely downward toward a vehicle rear in a vehicle side view and inclined obliquely rearward toward the outside of the vehicle in a vehicle top view.

2. The structure for lower vehicle body of vehicle front part according to claim 1, wherein
    the front surface of the lower part of the dash side inner panel and a front end part of a side sill outer panel forming the side sill are formed into inclined surfaces along the front surface of the lower part of the side outer panel and are arranged in an overlapping manner, and
    the dash side inner panel, the side sill outer panel, and the side outer panel are connected together by spot welding in an overlapping surface portion.

3. The structure for lower vehicle body of vehicle front part according to claim 1, wherein an angle of inclination of the front surface of the dash side member toward the vehicle rear and an angle of inclination of the front surface of the lower part of the side outer panel are set to coincide with each other.

4. The structure for lower vehicle body of vehicle front part according to claim 3, wherein
    a flange extending in the vehicle up-down direction is provided to an outer end part of the dash side member, and
    the flange of the dash side member is connected to the flanges of the side outer panel and the dash side inner panel.

5. The structure for lower vehicle body of vehicle front part according to claim 1, wherein
    a flange extending in the vehicle up-down direction is provided to an outer end part of the dash side member, and
    the flange of the dash side member is connected to the flanges of the side outer panel and the dash side inner panel.

6. The structure for lower vehicle body of vehicle front part according to claim 2, wherein
    a flange extending in the vehicle up-down direction is provided to an outer end part of the dash side member, and
    the flange of the dash side member is connected to the flanges of the side outer panel and the dash side inner panel.

7. The structure for lower vehicle body of vehicle front part according to claim 2, wherein an angle of inclination of the front surface of the dash side member toward the vehicle rear and an angle of inclination of the front surface of the lower part of the side outer panel are set to coincide with each other.

* * * * *